(12) United States Patent
Chang

(10) Patent No.: US 7,231,936 B2
(45) Date of Patent: Jun. 19, 2007

(54) HOT/COLD WATER TUBE CONNECTION STRUCTURE FOR PLASTIC FAUCETS

(76) Inventor: Kim Chang, No.8,An Lin Rd.,Yeong An Li,Hsin Tun Dist., Taichung City (TW)

( * ) Notice: Subject to any disclaimer, the term of this patent is extended or adjusted under 35 U.S.C. 154(b) by 172 days.

(21) Appl. No.: 11/157,191

(22) Filed: Jun. 21, 2005

(65) Prior Publication Data

US 2006/0283504 A1 Dec. 21, 2006

(51) Int. Cl.
*E03C 1/04* (2006.01)

(52) U.S. Cl. .................. 137/328; 137/801

(58) Field of Classification Search ........ 137/328, 137/801
See application file for complete search history.

(56) References Cited

U.S. PATENT DOCUMENTS

| | | | | |
|---|---|---|---|---|
| 1,069,876 A | * | 8/1913 | Houser | 137/328 |
| 3,190,306 A | * | 6/1965 | Staat et al. | 137/328 |
| 3,234,958 A | * | 2/1966 | Butters | 137/328 |
| 4,548,224 A | * | 10/1985 | McLaughlin | 137/15.06 |
| 5,464,045 A | * | 11/1995 | Niemann et al. | 137/801 |
| 6,874,527 B2 | * | 4/2005 | Meeder | 137/359 |

* cited by examiner

*Primary Examiner*—Kevin Lee
(74) *Attorney, Agent, or Firm*—Troxell Law Office, PLLC

(57) ABSTRACT

A hot/cold water tube connection structure for plastic faucets comprises a hot/cold water connector tube made up of a valve seat and a coupling tube wherein the valve seat has a screw tube extending downwards at the bottom of a stop ring, and a sealing ring mounted at an appropriate position of the screw tube thereon to form engaging rings at both sides thereof. The coupling tube has an oblique face indented at one end edge against which a water-sealing hoop mounted at a screw joint of a water inlet tube is securely abutted, and a coupling joint with an internal screw thread section disposed at the inner wall of the other end thereof. Therefore, the connector tube assembled can avoid the problem of gaps found in the conventional tube connection structure, and facilitate an easer replacement thereof due to its separate type of design for economical and eco-protection purposes.

5 Claims, 4 Drawing Sheets

HOT/COLD WATER TUBE CONNECTION STRUCTURE FOR PLASTIC FAUCETS

BACKGROUND OF THE INVENTION

The present invention is related to a hot/cold water tube connection structure for plastic faucets, comprising a hot/cold water connector tube made up of a valve seat and a coupling tube wherein the valve seat has a screw tube with engaging rings that can be securely locked to a coupling joint with an internal screw thread section of the coupling tube to provide a separate type of design thereof which can not only achieve securer connection structure to avoid the problem of gaps found in the conventional tube connection structure, but also facilitate an easier replacement thereof for economical efficiency and eco-protection purpose.

Please refer to FIGS. 1 to 2 inclusive. A conventional plastic faucet 10 includes a hot/cold water connector tube 11, 12 made up of a valve seat 13 (referring to FIG. 2) that is injection-molded to integrally combine with a metallic outer tube 111, 121 having a screw thread section defining thereon and form a plastic-and-metallic bound inner tube 112, 122 at the inner wall thereof. Due to the principle of hot-expansion and cold-contraction thereof, the processed inner tube 112, 122 after cooling off tends to get shrunken inwards and fail to keep an even surface with the end edge of the outer tube 111, 121 thereof. As a result, when a screw joint 21 of a water inlet tube 20 is coupled with the outer tube 111, 121, a water-sealing hoop 22 mounted at the screw joint 21 can simply abut against the end surface of the outer tube 111, 121, which, relatively reducing the sealing off area thereof, can hinder the connection structure to positively resist the water pressure and may lead to the problem of water leakage thereby. In addition, the deformed inner tube 112, 121 shrunken after the cooling off process thereof can also affect its combination with the outer tube 111, 121 with a gap A revealed there-between and result in a poor connection structure thereby. And, the hot/cold water connector tube 11, 12 is injection-molded of the inner and outer tubes 112, 122, 111, 121 and integrally combined with the valve seat 13 into one unit. In case the valve seat 13 is worn out of use, the hot/cold water connector tube 11, 12 must also be replaced along with the valve seat 13, which is not only uneconomical, but may increase the burden to the environment.

SUMMARY OF THE PRESENT INVENTION

It is, therefore, the primary purpose of the present invention to provide a hot/cold water tube connection structure for plastic faucets, comprising a hot/cold water connector tube made up of a valve seat and a coupling tube wherein the valve seat has a screw tube with engaging rings that can be securely locked to a coupling joint with an internal screw thread section of the coupling tube to provide a separate type of design thereof which can not only achieve securer connection structure to avoid the problem of gaps caused by the contraction/expansion phenomena of the conventional tube connection structure above, but also facilitate an easier replacement without the hot/cold water connector tube being replaced as a whole set to achieve economical efficiency and eco-protection purpose thereof.

It is, therefore, the second purpose of the present invention to provide a hot/cold water tube connection structure for plastic faucets wherein the coupling tube has an oblique face disposed at the opening edge of the other end therein so that when the coupling tube is locked to a screw joint of a water inlet tube, a water-sealing hoop mounted at the screw joint thereon will securely abut tight against both the conjoining end surface and the oblique face thereof, securely reinforcing the close connection structure thereof to ensure a positive resistance to water pressure and efficiently avoid the problem of water leakage thereby.

DETAILED DESCRIPTION OF THE PREFERRED EMBODIMENTS

Figure 1:
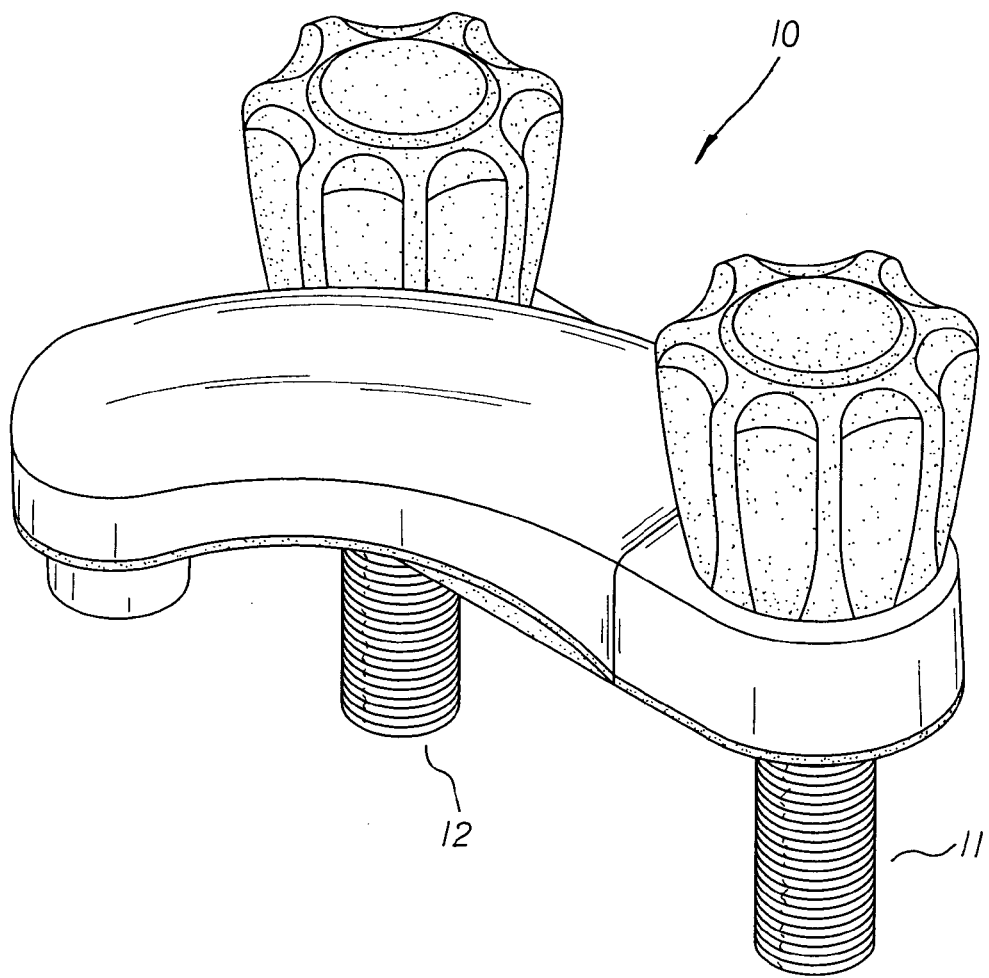
FIG. 1 is a perspective view of a conventional tube connection structure.
Figure 2:
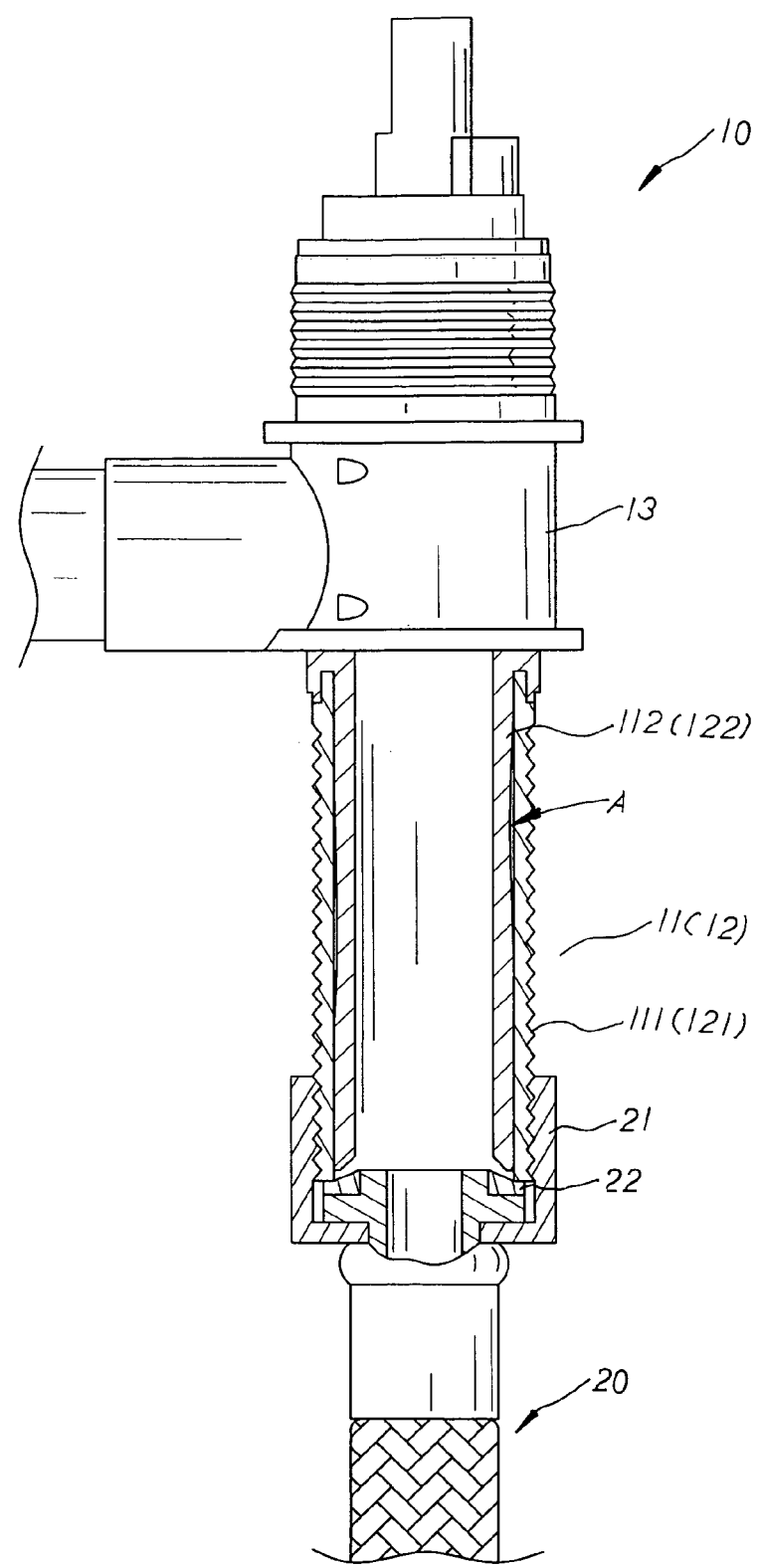
FIG. 2 is a cross sectional view of the conventional tube connection structure in assembly.
Figure 3:
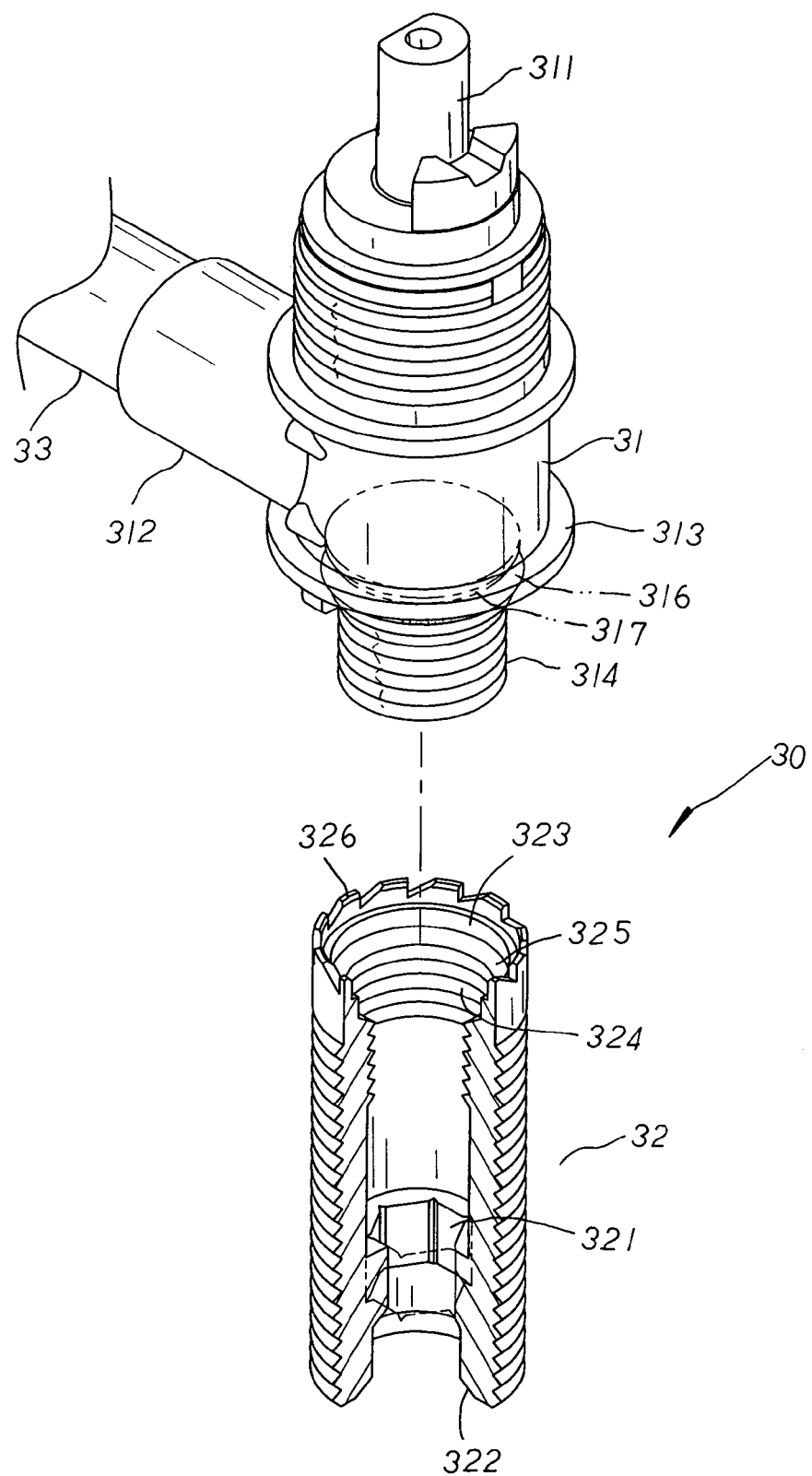
FIG. 3 is an exploded perspective view of the present invention.
Figure 4:
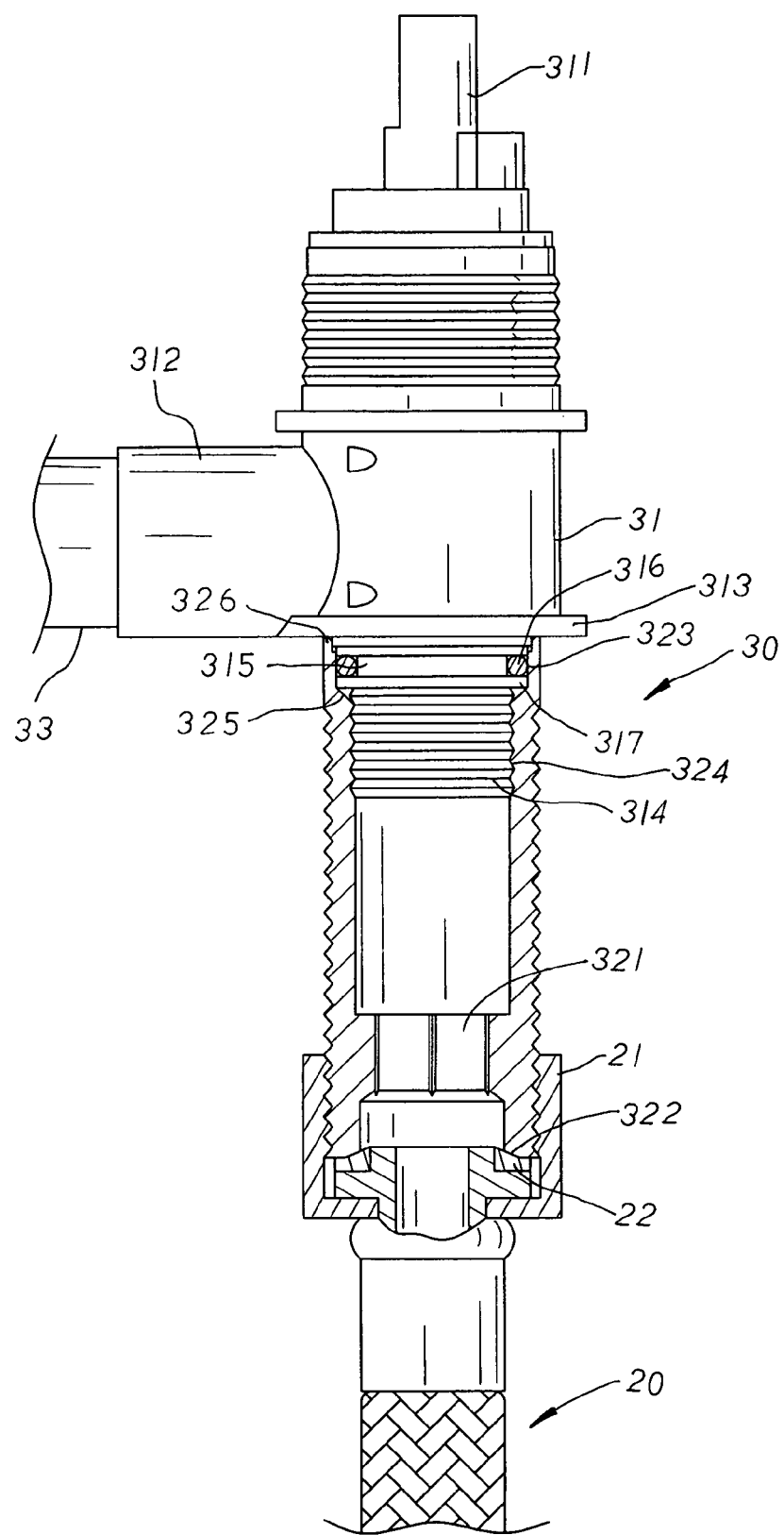
FIG. 4 is a cross sectional view of the present invention in assembly.

Please refer to FIG. 3 showing an exploded perspective view of the present invention (accompanied by FIG. 4). The present invention is related to a hot/cold water tube connection structure for plastic faucets, comprising a hot/cold water connector tube 30 of a plastic faucet that is made up of a valve seat 31 having a control valve 311 accommodated therein, and a coupling tube 32. The valve seat 31 is equipped with a duct portion 32 protruding at one side to engage and communicate with a water discharge tube 33 thereby, a stop ring 313 of a larger diameter disposed at the bottom side thereon, and a screw tube 314 of a smaller diameter extending downwards at the bottom of the stop ring 313 thereof. At an appropriate position of the screw tube 314 thereof is disposed an annular groove 315 for the accommodation of a sealing ring 316 therein and a set of engaging rings 317 is formed to define both upper and lower sides of the annular groove 315 thereof. The coupling tube 32, molded of copper element, is provided with a polygonal tool notch 321 defining the inner wall of one end with an oblique face 322 cut inward at the opening edge of the corresponding end therein, and a coupling joint 323 with an internal screw thread section 324 disposed at the inner wall of the other end thereof. Between the coupling joint 323 and the internal screw thread section 324 is disposed an oblique and conic guide face 325, permitting the screw tube 314 of the valve seat 31 led from top to bottom to the coupling tube 32 thereof to slide along the guide face 325 till reciprocally locked to the internal screw thread section 324 to form a first layer of connection structure thereof. Then, the engaging rings 317 of the screw tube 314 thereof can be securely retained at the coupling joint 323 therein and limited in position by the guide face 325 thereof so as to form a second layer of connection and achieve better locking-up structure thereby. Meanwhile, the sealing ring 316 is limited in position by the engaging rings 317 to accurately abut tight against the inner wall of the coupling joint 321 thereby. At the end edge adjacent to the coupling joint 323 of the coupling tube 32 is disposed a plurality of toothed inserting portions 326 having inverted cornered edges formed at the inner side thereof, and force is applied via a tool accommodated to the tool notch 321 thereof to rotate the coupling tube 32, permitting the toothed inserting portions 326 thereof to securely bite with the bottom surface of the stop ring 313 and form a third layer of connection structure thereby so as to reinforce the close registration between the coupling tube 32 and the valve seat 31 thereof. Besides, when the coupling tube 32 is reciprocally locked to a screw joint 21 of a water inlet tube 20, a water-sealing hoop 22 will simultaneously abut tight against the conjoining end edge and the oblique face 322 thereof to strengthen the close mutual engagement thereof and ensure a positive resistance against water pressure to avoid the problem of water leakage thereby.

What is claimed is:

1. A hot/cold water tube connection structure for plastic faucets, comprising a hot/cold water connector tube of a plastic faucet that is made up of a valve seat having a control valve accommodated therein, and a coupling tube wherein the valve seat has a duct portion protruding at one side to engage and communicate with a water discharge tube thereby, and a stop ring of a larger diameter disposed at the bottom side thereon; the tube connection structure being characterized by that, the valve seat having a screw tube of a smaller diameter extending downwards at the bottom of the stop ring thereof, an annular groove indented at an appropriate position of the screw tube thereon for the accommodation of a sealing ring therein, and a set of engaging rings extending at both upper and lower sides of the annular groove thereof;

the coupling tube being equipped with an oblique face indented at one end edge thereon, against which a water-sealing hoop mounted at the inner wall of a screw joint of a water inlet tube is securely abutted; the coupling tube also having a coupling joint with an internal screw thread section disposed at the inner wall of the other end thereof wherein between the coupling joint and the internal screw thread section is disposed an oblique and conic guide face, permitting the screw tube of the valve seat to slide along the guide face and reciprocally lock to the internal screw thread section of the coupling tube till the engaging rings of the screw tube securely retained at the coupling joint therein and limited in position by the guide face thereof so as to form a secure and positive tube connection structure thereby.

2. The hot/cold water tube connection structure for plastic faucets as claimed in claim 1 wherein the coupling tube thereof can also have a plurality of toothed inserting portions protruding at the end edge opposite to the oblique face disposed at the other end thereof.

3. The hot/cold water tube connection structure for plastic faucets as claimed in claim 1 wherein the coupling tube thereof also includes a polygonal tool notch defining the inner wall of one end thereon.

4. The hot/cold water tube connection structure for plastic faucets as claimed in claim 1 wherein the coupling tube thereof is made in copper element.

5. The hot/cold water tube connection structure for plastic faucets as claimed in claim 2 wherein the toothed inserting portions of the coupling tube can have inverted cornered edges formed at the inner side thereof.

* * * * *